(12) United States Patent
Klein et al.

(10) Patent No.: US 7,564,783 B2
(45) Date of Patent: Jul. 21, 2009

(54) METHOD FOR ASSIGNING OF CHANNEL CAPACITY TO COMMUNICATION LINKS

(75) Inventors: Siegfried Klein, Stuttgart (DE); Klaus Keil, Esslingen (DE)

(73) Assignee: ALCATEL, Paris (FR)

( * ) Notice: Subject to any disclaimer, the term of this patent is extended or adjusted under 35 U.S.C. 154(b) by 1126 days.

(21) Appl. No.: 10/418,079

(22) Filed: Apr. 18, 2003

(65) Prior Publication Data

US 2003/0198249 A1    Oct. 23, 2003

(30) Foreign Application Priority Data

Apr. 19, 2002   (EP)   ................................. 02360126

(51) Int. Cl.
*H04J 1/16* (2006.01)
*H04L 12/403* (2006.01)
*H04L 12/42* (2006.01)

(52) U.S. Cl. .................................. 370/230; 370/449
(58) Field of Classification Search ................. 370/329, 370/338, 431, 449, 465
See application file for complete search history.

(56) References Cited

U.S. PATENT DOCUMENTS

| 6,223,041 | B1 | 4/2001 | Egner et al. | |
|---|---|---|---|---|
| 6,434,380 | B1 * | 8/2002 | Andersson et al. | 455/406 |
| 6,807,159 | B1 * | 10/2004 | Shorey et al. | 370/318 |
| 2002/0093930 | A1 * | 7/2002 | Dertz et al. | 370/337 |
| 2002/0167961 | A1 * | 11/2002 | Haartsen | 370/444 |
| 2002/0177413 | A1 * | 11/2002 | Jouppi et al. | 455/67.1 |

FOREIGN PATENT DOCUMENTS

| WO | WO 00/60811 A1 | 10/2000 |
|---|---|---|
| WO | WO 00/62491 A1 | 10/2000 |

OTHER PUBLICATIONS

John I. Capetanakis, "Tree Algorithms for Packet Broadcast Channels" IEEE Transactions on Information Theory, vol. IT-25, No. 5, Sep. 1979, pp. 505-515.

Jeremiah F. Hayes, "Local Distribution in Computer Communications" IEEE Communications Magazine, Mar. 1981, pp. 6-14.

* cited by examiner

*Primary Examiner*—Kevin C Harper
(74) *Attorney, Agent, or Firm*—Sughrue Mion, PLLC.

(57) ABSTRACT

A method for assigning of channel capacity to communication links in a cellular communication system and to an access controller for controlling the access of contending terminals to channel capacity of a cellular communication system is provided. One or more traffic parameters is determined for each of the communication links, and a requirement for channel capacity for each of the communication links is predicted based on the one or more traffic parameter. A channel capacity is then assigned to the communication link based on the predicted requirement.

10 Claims, 3 Drawing Sheets

METHOD FOR ASSIGNING OF CHANNEL CAPACITY TO COMMUNICATION LINKS

The invention is based on a priority application EP 02 360 126.3 which is hereby incorporated by reference.

FIELD OF THE INVENTION

The present invention relates to the field of assigning of channel capacity to communication links in a cellular communication system, and more particularly but without limitation to polling techniques.

BACKGROUND AND PRIOR ART

One way to impose order on a system with multiple users having random access requirements is to institute a controller that periodically polls the user population to determine their service requests. If the user population is large and the traffic is bursty, the time required to poll the population can be an excessive overhead burden.

One technique for rapidly polling a user population is called a binary tree search, as disclosed in Hayes, J. F., "Local Distribution in Computer Communiations", IEEE Commun. Mag., March 1981, pp. 6-14. and Capetanakis, J., "Tree Algorithms for Packet Broadcast Channels," IEEE Trans. Inf. Theory, vol. IT25, September 1979, pp. 505-515.

U.S. Pat. No. 5,818,845 shows an asymmetric network communication system for use in a client-server environment having independent forward and return channels operating at different speeds and/or under different protocols on the same or different communication media to provide efficient utilization of shared resources. A network manager, such as a hybrid access system, effects transmission of packetized data on a forward (downstream) channel from the host server to multiple client devices coupled with a shared downstream media at 10 or more megabits per second while simultaneously providing selectable multiple lower speeds of operation on shared or dedicated return (upstream) channels from the client devices to the host server depending on bandwidth availability, bandwidth demand, service level authorization, etc. for the return channel.

It is an object of the present invention to provide an improved method for assigning of channel capacity and an improved access controller.

SUMMARY OF THE INVENTION

The object of the present invention is solved basically by applying the features laid down in the independent claims. Preferred embodiments of the invention are given in the dependent claims.

The present invention provides for a method for dynamically assigning of channel capacity to communication links depending on the actual traffic. In essence, at least one traffic parameter is determined for each active logical communication link. This determination forms the basis for predicting the requirements of the communication links for channel capacity. The available channel capacity of the physical communication channel is then allocated to the logical links in accordance with the predicted requirements.

Alternatively the allocation of channel capacity is not performed directly based on the predicted requirements. Rather the frequency of polling the involved terminals for their requirements is determined based on the predicted requirements for channel capacity. In other words the prediction of requirements for channel capacity of the communication links is utilized to estimate when a communication link requires polling in order to precisely communicate its requirement for channel capacity.

In accordance with a preferred embodiment of the invention the data throughput is determined as a characteristic traffic parameter for each of the communication links. Alternatively or in addition one or more of the following characteristic traffic parameters are determined, e.g.:
  delay between two successive requests for channel capacity or the delay between two successive polling operations with respect to a given communication link,
  variance of the delay between two successive requests, or number of Bytes to be transferred in uplink on a communication link.

In some communication systems it is sufficient to determine one or more of the characteristic traffic parameters only with respect to uplink connections because the traffic on the downlink connection is known to the access controller.

In accordance with a further preferred embodiment of the invention the requirements for channel capacity of the individual communication links are predicted based on the characteristic traffic parameters. Alternatively or in addition traffic parameter profiles are utilized for the prediction.

In this instance the access controller has one or more traffic parameter profiles belonging to known protocols and/or applications. For example the access controller has one traffic parameter profile which is descriptive of the typical characteristic traffic parameters for a voice over IP communication. Another traffic parameter profile is descriptive of the typical characteristic traffic parameters for web browsing. Each of the traffic parameter profiles has assigned the typical requirement for channel capacity for that protocol and/or application and/or a typical polling frequency.

The characteristic traffic parameters which have been determined for a particular communication link are compared with the traffic parameter profiles. If a best matching traffic parameter profile can be identified the typical channel capacity requirement for that traffic parameter profile is utilized to predict the requirement for channel capacity of the corresponding communication link.

In accordance with a further preferred embodiment of the invention the cellular communication system in which the method of the invention is implemented is e.g. a time division duplex (TDD)/frequency division duplex (FDD)/time division multiple access (TDMA)/frequency division multiple access (FDMA) or code division multiple access (CDMA) communication system.

TDD defines the separation of a time frame in sub-frames for the up- and the downlinks. In frequency division duplex (FDD) this separation is done by means of different frequencies in the up- and the downlinks.

An example for a TDD/TDMA communication system is the Hiperlan 2 system.

In accordance with a further preferred embodiment of the invention the access controller is integrated into an access point of the cellular communication system. Each of the cells of the communication system has an access point which serves to provide service to the terminals within the cell of the access point.

In accordance with a further preferred embodiment of the invention the traffic parameters are determined in the mobile terminal rather than in the access controller. Preferably, the traffic parameters are communicated from the mobile terminals to the access controller as a Protocol Data Unit (PDU), for example via a control or signalling channel.

The present invention is particularly advantageous to efficiently allocate radio resources, i.e. channel capacity, to mobile terminals and their communication links with an access point. The overhead for performing polling operations is minimized as the polling frequency is dynamically changed and adapted to the current traffic characteristics of each communication link.

DETAILED DESCRIPTION

Figure 1:
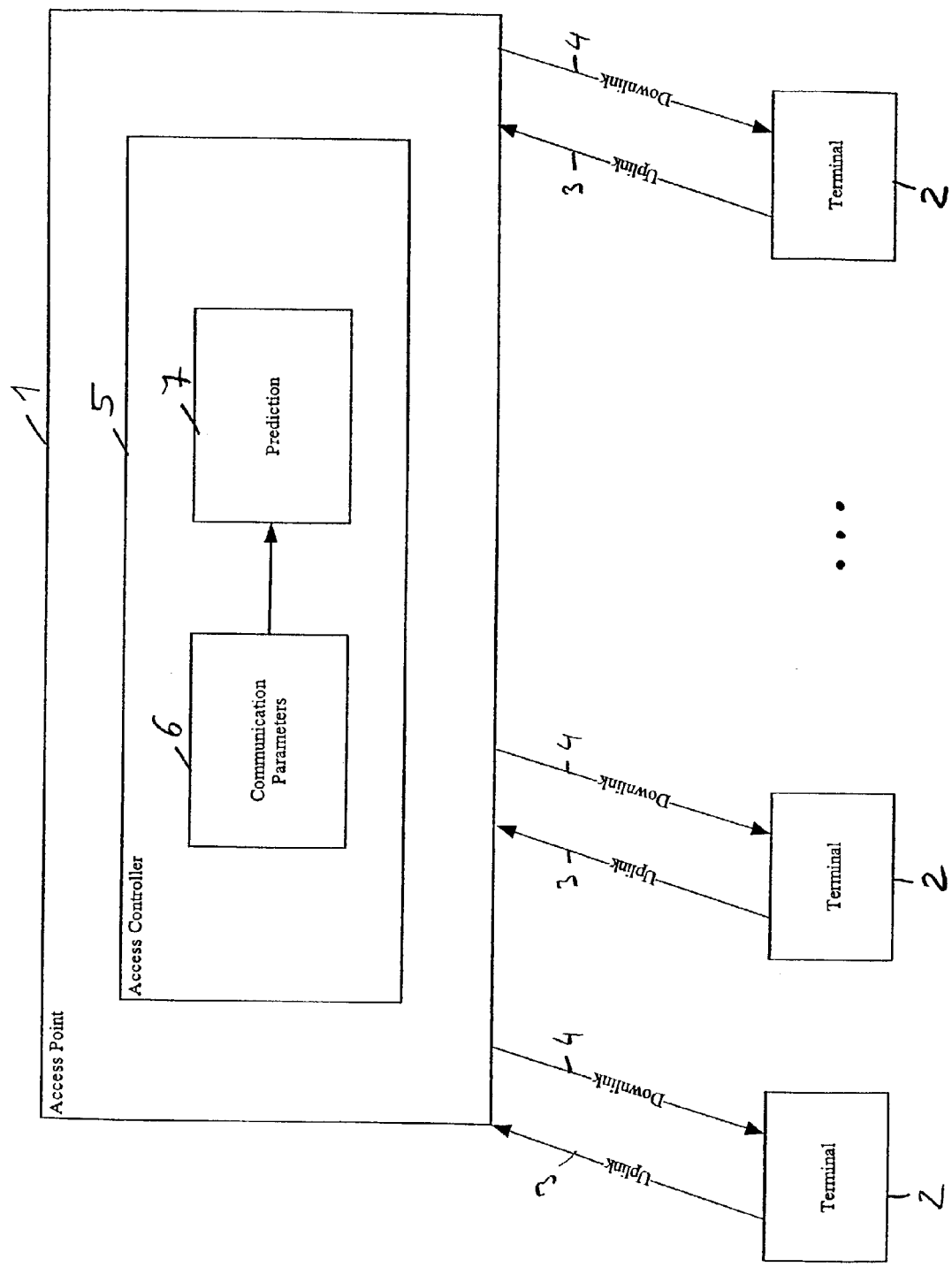
FIG. 1 is a block diagram of a cell of a cellular communication system with an access controller in accordance with the invention.

FIG. 1 illustrates a cell of a cellular communication system, such as a cellular mobile communication system, preferably a Hiperlan/2 AP communication system. Each of the cells of the communication system has an access point (AP) 1. The access point 1 serves to establish wireless communication links with a number of terminals 2 within the cells of the access point 1. For example there are uplinks 3 and downlinks 4 between the access point 1 and the terminals 2.

The terminals 2 can be any kind of electronic devices, such as mobile phones, mobile computers, mobile personal digital assistance (PDAs) or office equipment having a wireless interface.

Without restriction of generality it is assumed that time division multiplexing is used in the communication system considered here, i.e. there is one physical channel within each of the cells which is time division multiplexed. In the case of an Hiperlan communication system this means that each time frame of the physical channel is subdivided into time slots for the uplinks 3 and the downlinks 4. At the beginning of each time frame information on the assignment of uplinks 3 and downlinks 4 to time slots within the time frame is communicated to the involved terminals 2.

For the allocation of channel capacity to uplinks 3 and downlinks 4 an access controller 5 is provided within access point 1. The purpose of access controller 5 is to determine which one of the uplinks 3 is assigned to which ones of the available time slots within a time frame, if any. Likewise this determination is also made for the downlinks 4 by the access controller 5.

The difference between the uplinks 3 and the downlinks 4 is that the planning for the downlinks 4 is deterministic in that it is known to the access controller 5 which data needs to be transmitted in the following time-frame. The allocation of resources for the uplinks 3 is non-deterministic as this depends on the actual requirements of the terminals 2.

For this purpose the access controller 5 contains a module 6 which serves to determine communication parameters for each one of the uplinks 3. For instance characteristic traffic parameters such as the data throughput on the uplinks 3 is determined for each individual uplink 3. Alternatively characteristic traffic parameters such as the burstiness, i.e. the meantime between two bursts and its variance, data rate and/or number of Bytes to be transferred in uplink are determined by the module 6.

The measurement of such characteristic traffic parameters for each of the uplinks 3 forms the basis to predict the requirement for channel capacity of each one of the uplinks 3 by means of module 7 of the access controller 5. The allocation of resources, i.e. the assignment of uplinks 3 to time slots within the following time frame, is done based on this prediction in order to fulfil all predicted requirements for channel capacity to the largest extend possible.

Alternatively or in addition the module 7 contains one or more traffic parameter profiles which are descriptive of typical characteristic traffic parameters of certain protocols and/or applications, such as voice over IP or web browsing. Each of these traffic parameter profiles has an assigned typical requirement for channel capacity and/or polling frequency.

For example in the case of voice over IP data packets are transmitted each 50 to 100 ms in packets of 300 Bytes. If the characteristic traffic parameters of one of the uplinks 3 matches the traffic parameter profile of voice over IP this typical requirement for channel capacity assigned to the voice over IP traffic parameter profile is utilized for the allocation of resources.

Alternatively or in addition a polling technique is used. In this case the access controller 5 can poll the terminals 2 for resources and the terminals 2 respond by messages indicating the required resources, i.e. channel capacity. For the polling a control channel can be used, such as the random access channel in the case of Hiperlan.

The overhead which is necessary for the polling is minimized by utilizing the results of the prediction performed by module 7. If the prediction of a particular one of the uplinks 3 indicates that this particular uplink 3 is likely to require channel capacity a corresponding polling request is sent from the access controller 5 to the corresponding one of the terminals 2. The terminal 2 responds by means of a protocol data unit (PDU) indicating its precise requirement for channel capacity. In this instance the allocation of channel capacity is performed on the basis of the results of the polling operations performed.

These two alternative approaches are explained in greater detail in the below description making reference to FIG. 2 and FIG. 3.

Figure 2:
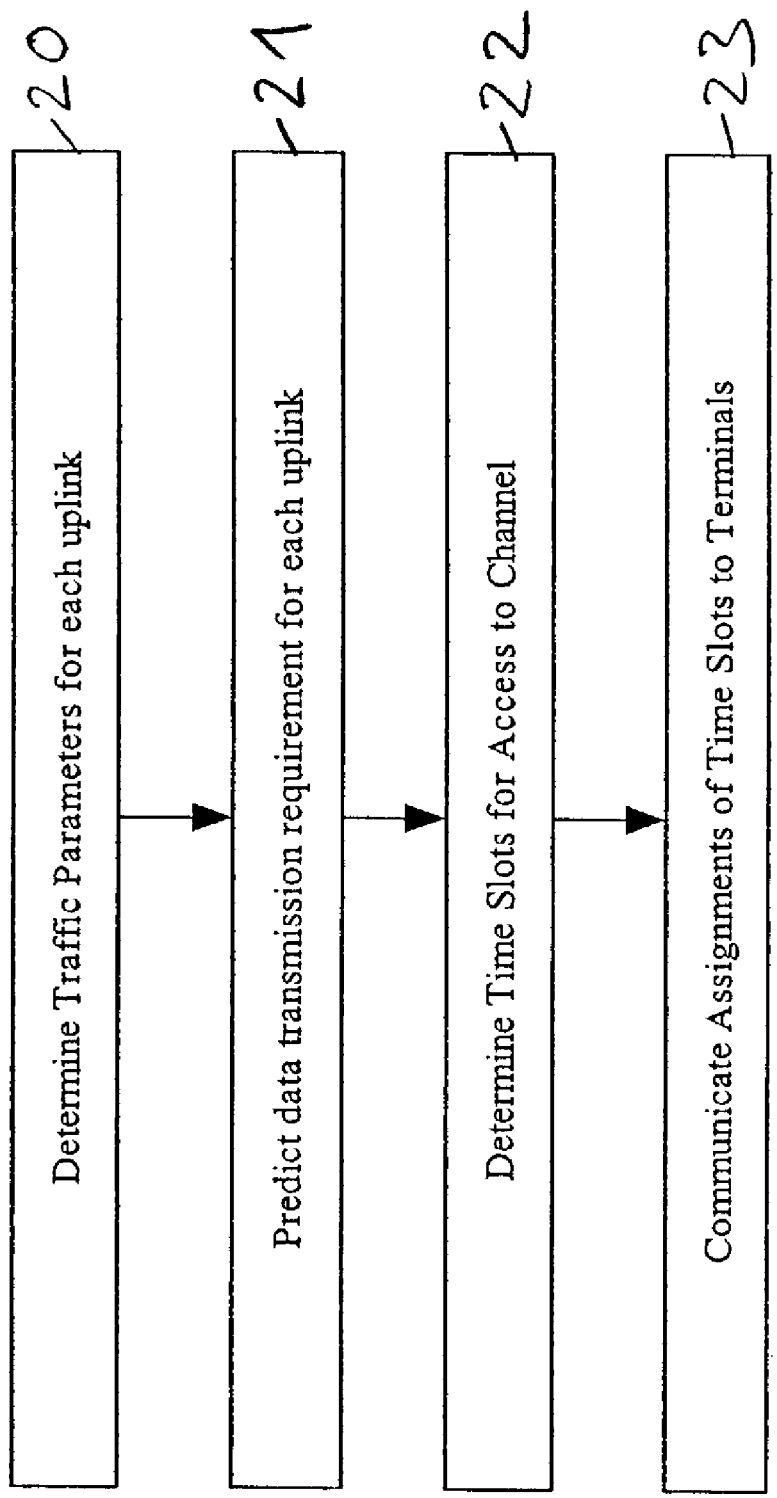
FIG. 2 is illustrative of a first embodiment of a method of the invention.

FIG. 2 is illustrative of an embodiment where the allocation of resources is performed directly based on the results of the prediction. In step 20 the characteristic traffic parameters are determined for each of the uplinks. In step 21 the radio resources required for each of the uplinks is predicted based on the traffic parameters which have been observed. This can be done by an extrapolation of past traffic or more sophisticated schemes can be employed. One way of performing the prediction is the utilization of traffic parameter profiles which are descriptive of known protocols and/or applications as it has been explained in greater detail by making reference to FIG. 1.

In step 22 time slots within the following time frame are assigned to individual ones of the uplinks in order to allocate channel capacity. These assignments are communicated to the terminals within the same cell in step 23.

Figure 3:
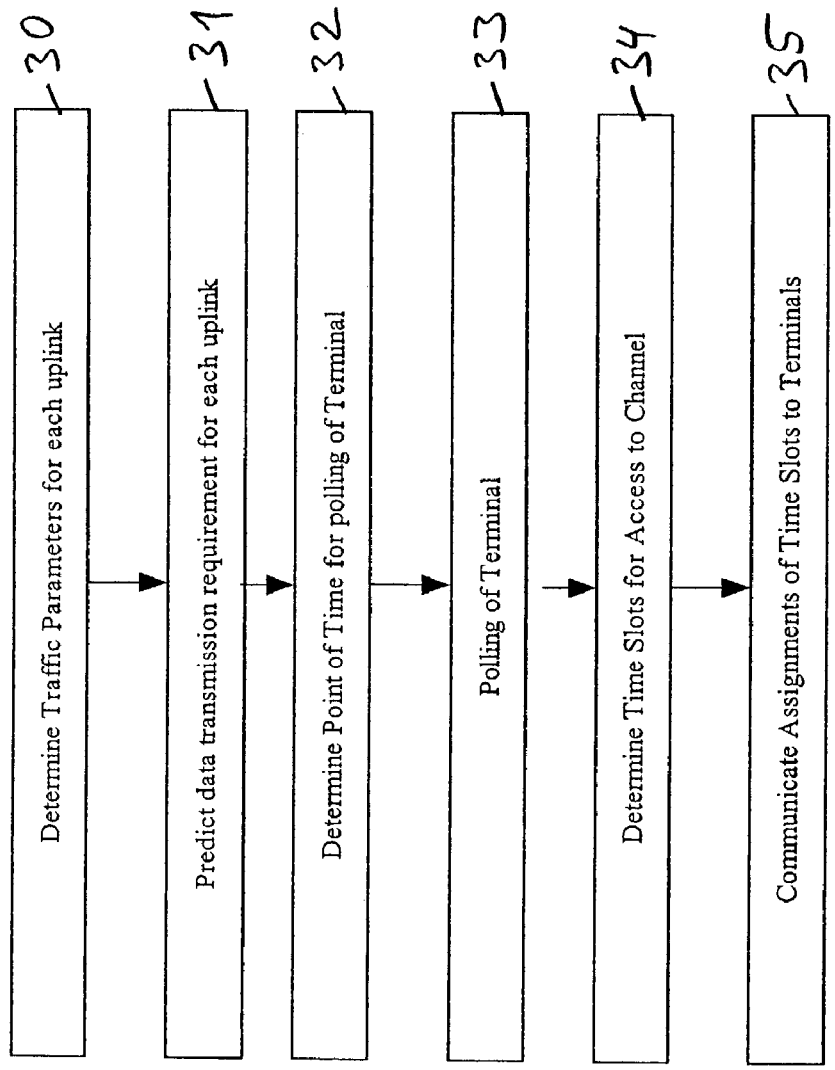
FIG. 3 is illustrative of a second embodiment of a method of the invention.

FIG. 3 is illustrative of an embodiment where the allocation of channel capacity is not performed directly based on the predicted requirements but based on the concrete results of polling operations which have been performed. The steps 30 and 31 are analogous to steps 20 and 21 of FIG. 2.

In step 32 the required points of time for performing the next polling operation with respect to individual ones of the terminals within the considered cell are determined based on the predicted resource requirements. Alternatively a polling frequency is determined in step 32 for all involved terminals.

In step 33 the required polling operations are performed. The step 34 is analogous to step 22 in FIG. 2; however the assignment of time slots to uplinks is based on the results of the polling instead of the result of the prediction as it is the case in the embodiment of FIG. 2.

Step 35 is equivalent to step 23 of FIG. 2.

The invention claimed is:

1. A method for assigning of channel capacity to communication links in a cellular communication system, the method comprising the steps of:
   determining of one or more traffic parameters for each of the communication links,
   predicting a requirement for channel capacity for each of the communication links based on the one or more of the traffic parameters, and
   assigning of channel capacity to the communication links based on the predicted requirement;
   whereby the predicting comprises:
   comparing the one or more of the traffic parameters with one or more traffic parameter profiles of known protocols and/or applications,
   selecting a best matching traffic parameter profile, and
   predicting the requirement for channel capacity based on a typical requirement for channel capacity of the selected traffic parameter profile.

2. The method of claim 1, whereby one or more of the following traffic parameters are determined for a communication link:
   data throughput,
   delay between two polling operations,
   variance of the delay between two polling operations,
   number of Bytes to be transferred in uplink,
   Error control mode.

3. The method of claim 1, whereby the cellular communication system is a time division duplex or time division multiple access system or code division multiple access system.

4. A method for assigning of channel capacity to communication links in a cellular communication system, the method comprising the steps of:
   determining of one or more traffic parameters for each of the communication links,
   predicting a requirement for channel capacity for each of the communication links based on the one or more of the traffic parameters,
   determining points of time to perform a polling operation with respect to one of the communication links based on the predicted requirement for channel capacity of that communication link,
   performing the polling operation,
   assigning of channel capacity to the communication link based on the result of the polling,
   whereby the step of predicting is performed by:
   comparing the one or more of the traffic parameters with one or more traffic parameter profiles of known protocols and/or applications,
   selecting a best matching traffic parameter profile,
   predicting the requirement for channel capacity based on a typical requirement for channel capacity of the selected traffic parameter profile.

5. The method of claim 4, whereby one or more of the following traffic parameters are determined for a communication link:
   data throughput,
   delay between two polling operations,
   variance of the delay between two polling operations,
   number of Bytes to be transferred in uplink,
   Error control mode.

6. The method of claim 4, whereby the cellular communication system is a time division duplex/time division multiple access system or code division multiple access system.

7. An access controller for controlling the access of contending terminals to channel capacity of a cellular communication system comprising:
   means for determining of one or more traffic parameters for each of the communication links,
   means for predicting a requirement for channel capacity for each of the communication links based on the one or more of the traffic parameters, and
   means for assigning of channel capacity to the communication links based on the predicted requirements;
   whereby the means for predicting performs the predicting by:
   comparing the one or more of the traffic parameters with one or more traffic parameter profiles of known protocols and/or applications,
   selecting a best matching traffic parameter profile, and
   predicting the requirement for channel capacity based on a typical requirement for channel capacity of the selected traffic parameter profile.

8. Access controller for controlling the access of contending terminals to channel capacity of a cellular communication system comprising:
   means for determining of one or more traffic parameters for each of the communication links,
   means for predicting a requirement for channel capacity for each of the communication links based on the one or more of the traffic parameters,
   means for determining points of time to perform a polling operation with respect to one of the communication links based on the predicted requirement for channel capacity of that communication link,
   mean for performing the polling operation,
   means for assigning of channel capacity to the communication link based on the result of the polling,
   whereby the means for predicting is performed by:
   means for comparing the one or more of the traffic parameters with one or more traffic parameter profiles of known protocols and/or applications,
   means for selecting a best matching traffic parameter profile, and
   means for predicting the requirement for channel capacity based on a typical requirement for channel capacity of the selected traffic parameter profile.

9. The method of claim 1, wherein the cellular communication system is a Hiperlan system.

10. The method of claim 4, wherein the cellular communication system is a Hiperlan system.

* * * * *